Oct. 17, 1939.                R. F. GILCHRIST                 2,176,528
         FERTILIZER DISTRIBUTOR ATTACHMENT FOR CULTIVATORS
                         Filed May 8, 1937           3 Sheets-Sheet 2
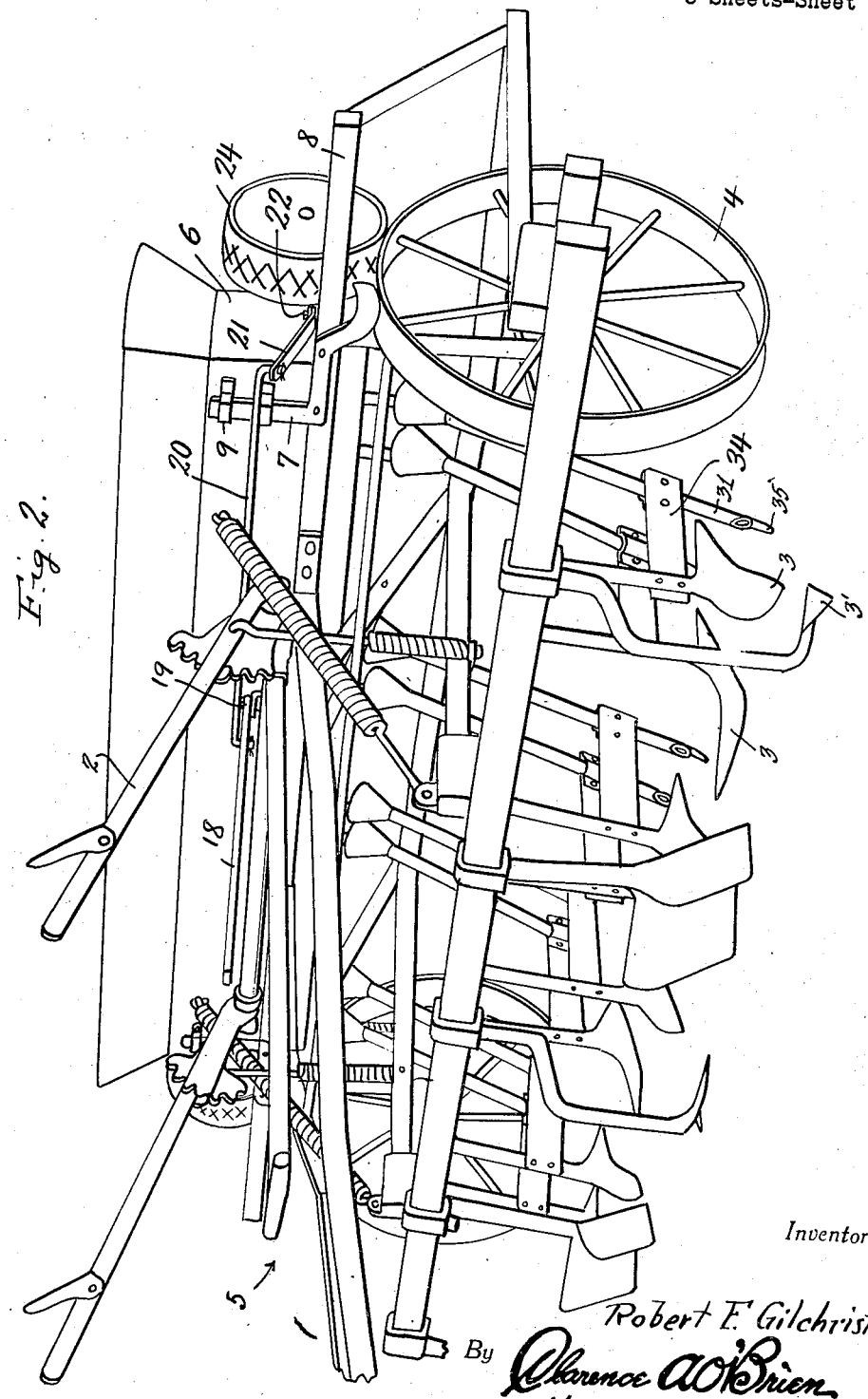

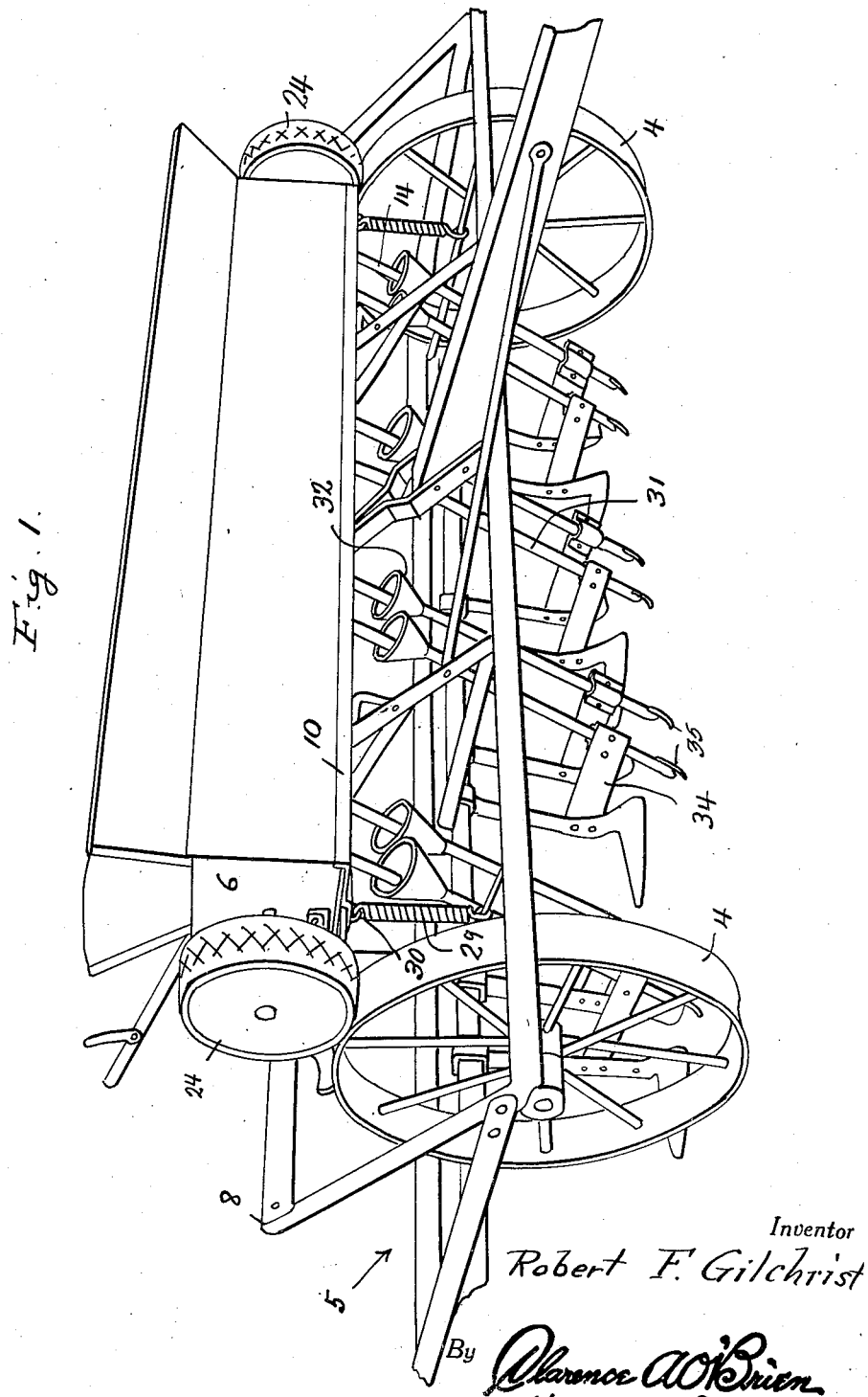

Oct. 17, 1939.　　　　R. F. GILCHRIST　　　　2,176,528
FERTILIZER DISTRIBUTOR ATTACHMENT FOR CULTIVATORS
Filed May 8, 1937　　　3 Sheets-Sheet 3
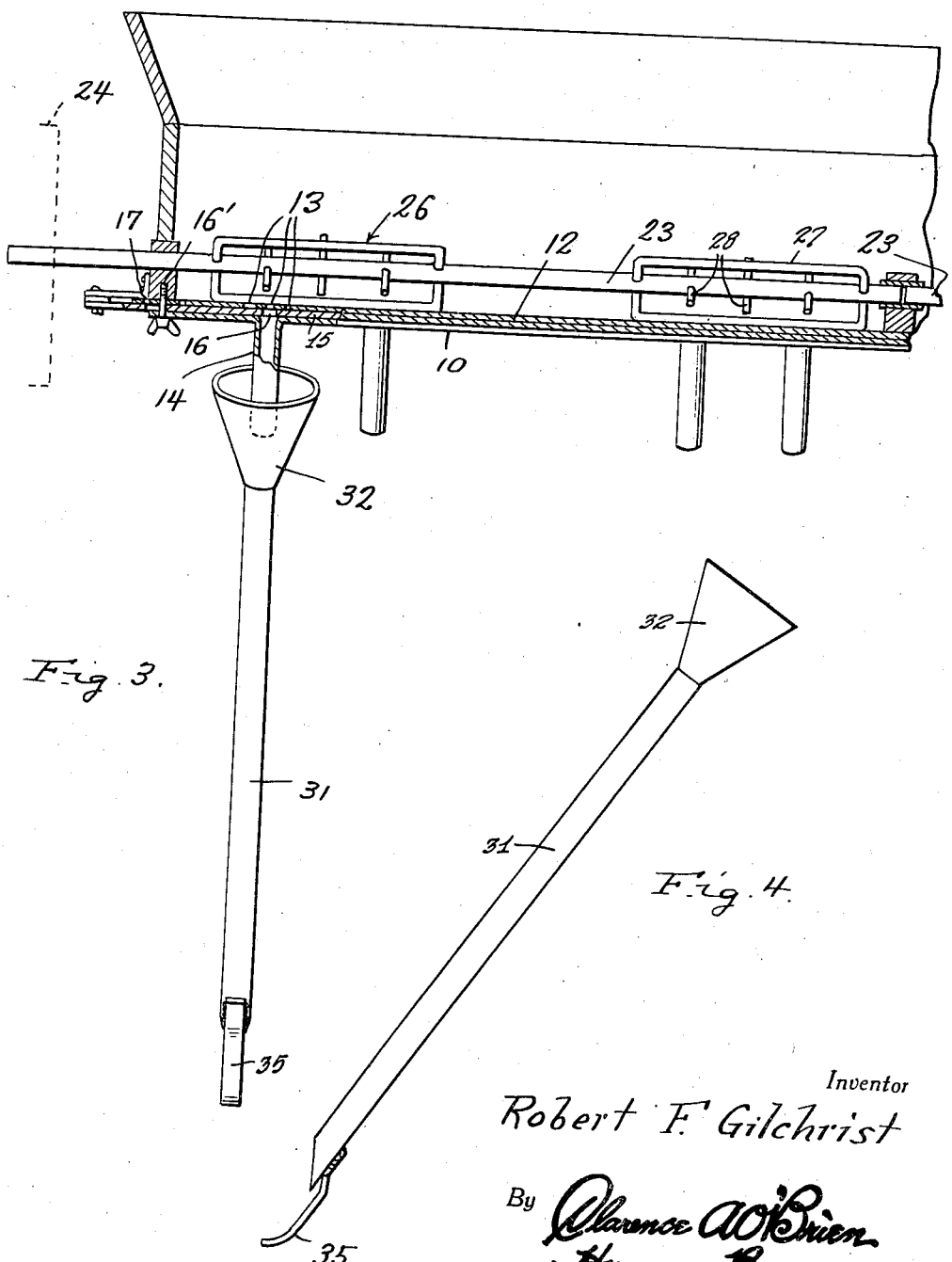

Patented Oct. 17, 1939

2,176,528

UNITED STATES PATENT OFFICE 2,176,528

FERTILIZER DISTRIBUTOR ATTACHMENT FOR CULTIVATORS

Robert F. Gilchrist, Ontario, Oreg.

Application May 8, 1937, Serial No. 141,549

1 Claim. (Cl. 111—52)

This invention relates to fertilizer distributors and an object of the invention is to provide a distributor in the form of an attachment which may be readily applied to a cultivator for applying fertilizer or soil dressing to the ground quickly and conveniently. A further object of the invention is to improve generally upon fertilizer attachments for cultivators as now generally known and used.

The invention together with its objects and advantages will be best understood from a study of the following description taken in connection with the accompanying drawings wherein:

Figure 1 is a perspective view of a cultivator illustrating the application of my invention thereto.

Figure 2 is a perspective view of the cultivator viewing the same from the rear side thereof.

Figure 3 is a detail vertical sectional view through the hopper and showing the agitator in elevation and also showing one of the boots.

Figure 4 is a side elevational view of a distributing boot.

Referring to the drawings more in detail it will be seen that I have illustrated my attachment as applied to a well known type of cultivator 5, the cultivator illustrated being that of a well known four row beet and bean cultivator. This cultivator includes the ground-engaging wheels 4, the swinging frame 1 raised and lowered by the hand lever 2, the frame carrying the pairs of weeders 3, the weeders of each pair being spaced apart to cultivate the soil on both sides of a row of plants and the plows 3' for cultivating the soil between the rows of plants.

In applying the invention to this type of cultivator I mount, suitably, on the cultivator, slightly forwardly of the earth working tools and above the traction wheels 4 of the cultivator an elongated hopper 6 in which the fertilizer to be distributed is placed.

The hopper 6 is mounted on the fertilizer so as to have movement perpendicularly or in a vertical plane through the medium of brackets 7 suitably mounted on a frame member 8 of the cultivator adjacent the respective opposite ends of the frame member, and these brackets 7 have upstanding ends which work through substantially U-shaped guide straps 9 arranged in pairs adjacent opposite ends of the hopper 6 and secured to one side of the hopper as shown in Figure 2. The purpose for so mounting the hopper 6 will presently appear.

The bottom of the hopper 6 is in the form of an elongated channel plate 10, the flanges of which are bolted or otherwise secured to the walls of the hopper. A false bottom 12 is provided for the hopper and is slidably confined within the channel of the bottom 10 for sliding movement relative to the bottom 10.

The plate 12 is provided at intervals with a series of openings 13 graduated in size, and for each series of openings 13 there is provided a spout 14 depending from the bottom plate 10. Thus it will be seen that the plate 12 may be shifted to bring any one of a group of openings 13 into alignment with a spout 14 as may be found desirable.

Slidably confined between the bottom plate 10 and the false bottom 12 is a valve or slide plate 15 which is provided for each spout 14 and series of openings 13 with an opening 16 for alignment with a spout and a selected one of the openings 13 when a flow of the fertilizer from the hopper through the spout 14 is desired, or to be moved out of alignment with the spout 14 and the aligned openings 13 when it is desired to cut off the flow of the fertilizer from the hopper.

The plate 12 is secured at the desired adjustment through the medium of a bolt 16' and a series of openings 17 through a selected one of which the bolt 16' passes into an end wall of the hopper as shown in Figure 3.

For shifting the slide plate 15 to control the flow of fertilizer through the spout 14 there is provided a hand lever 18 that is pivoted at one end on the cultivator as at 19. Adjacent its pivoted end the lever 18 is connected through the medium of a link 20 with an arm 21 bolted at one end to one end of the slide plate 15 as at 22. It will thus be seen that by properly manipulating the lever 18 the movement thereof will be transmitted to the slide plate 15 for positioning the same with the openings 16 over the spouts 14 to permit a discharge of the fertilizer or to a position with the opening 16 at one side of the spouts 14 so as to cut off the flow of the fertilizer.

Journaled in the hopper 6 are aligned agitator shafts 23 one end of which extend through the end walls of the hopper and have mounted thereon preferably rubber tired wheels 24 that engage the peripheries or rims of the transaction wheels 4 to provide a friction drive for the shafts 23.

On each shaft 23 there are provided at intervals scraping and feeding assemblies 26.

Each of the assemblies 26 consist of scraper elements 27 in the form of U-shaped rods secured to the shafts to extend at angles of 120 degrees to one another and adapted to have wiping engagement with the bottom 12 of the hopper for forcing the fertilizer contents of the hopper toward the openings 13. Further, each assembly 26 includes agitator fingers or prongs 28 that extend through the shaft 23 at the desired angular relation relative to one another and which act on the fertilizer to pulverize the latter.

For normally urging the hopper 6 together with the wheels 24 associated therewith downwardly for frictionally engaging the wheels 24 with the wheels 4 there are provided springs 29 suitably anchored at one end to the frame of the cultivator and connected at their upper ends as at 30 with the bottom plate 10 at the respective opposite ends of the hopper 6.

Further, there is provided for each spout 14 a distributor boot 31 which at its upper end is provided with a funnel-shaped mouth 32 into which a spout 14 extends. Adjacent the lower end thereof each boot 31 is secured in operative position to the shank of a weeder 3, through the medium of a suitable bracket structure 34.

Also at the lower end thereof the boot 31 is provided with a suitably shaped and constructed ground engaging member 35 which forms a small furrow in the ground to receive the fertilizer from the boot so that the fertilizer is deposited in the ground adjacent the roots of the plants and at each side of the row of plants.

From the above, it will be seen that as the cultivator moves over the ground drive from the traction wheels 4 will be transmitted through the wheels 24 to the shafts 23 for rotating the latter so that through the medium of the assemblies 26 the fertilizer in the hopper 6 will be constantly agitated and ground up and thus prevented from becoming lumpy. Also wth the plates 12 and 15 in proper position of adjustment the fertilizer will pass through the aligned openings in the plates and the spouts 14 into the boots 31 to be distributed into the ground in front of the earth working tools of the cultivator.

By attaching the boots to the weeders by the brackets 34 and providing the boots with the enlarged mouths 32, the frame 1 can be adjusted to cause the ground working tools to properly enter the ground without interfering with the introduction of the fertilizer from the spouts 14 into the boots, or with the proper disposition of the fertilizer into the ground, adjacent the roots of the plants, by the boots.

It is thought that a clear understanding of the construction, utility and advantages of a distributor of this character will be had without a more detailed description.

Having thus described the invention, what is claimed as new is:

An attachment for a cultivator which includes a pair of ground working members spaced apart to work the ground on both sides of a row of plants, a frame carrying the ground working members and manual means for adjusting the frame vertically, said attachment comprising a hopper, a pair of spouts depending from the bottom of the hopper for receiving material from the hopper, brackets connected with intermediate portions of the ground working members and extending forwardly therefrom, a boot solely supported by each bracket, the bracket being connected with the boot intermediate the ends of the boot and each boot having a substantially funnel-shaped upper end into which a spout extends, and a soil engaging member having its upper end connected to the lower end of each boot at the front thereof, said soil engaging member making a small furrow for receiving the material dropping from the boot.

ROBERT F. GILCHRIST.